UNITED STATES PATENT OFFICE.

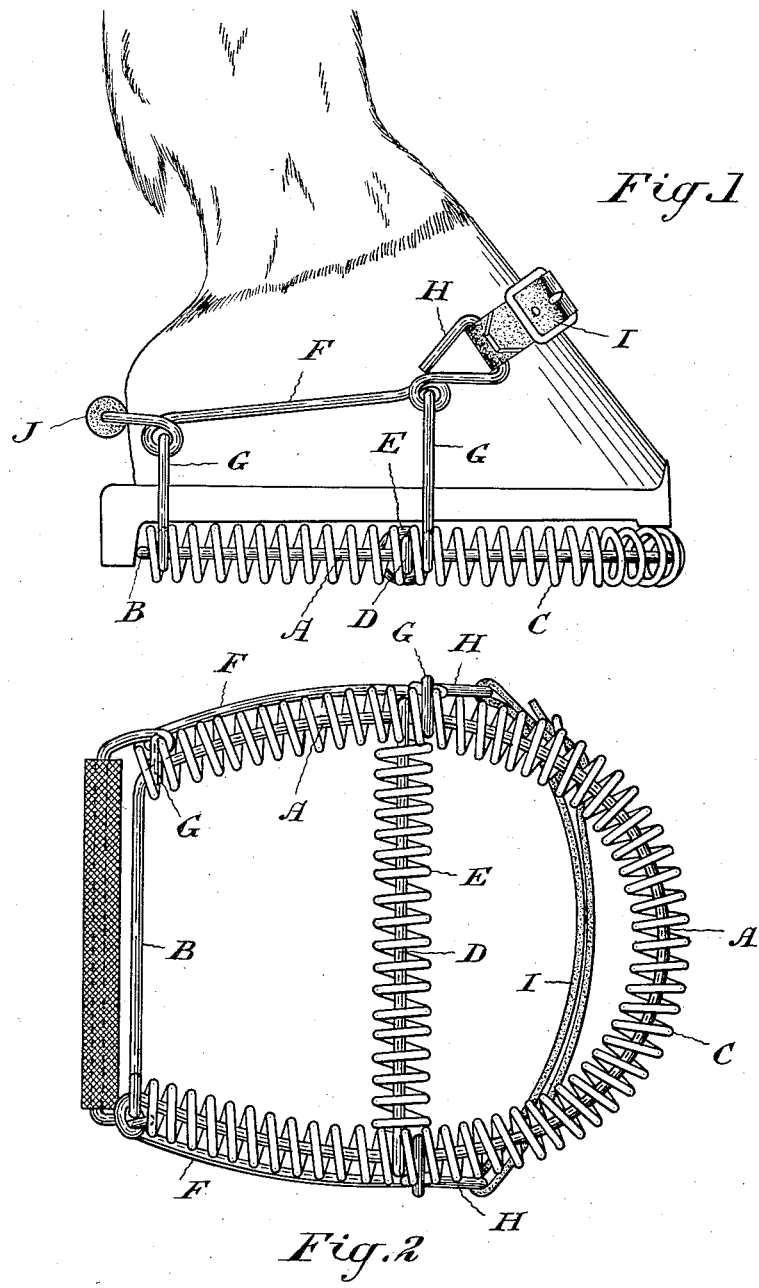

PHILIP STRUCK, OF TORONTO, ONTARIO, CANADA, ASSIGNOR OF ONE-HALF TO ASA B. WILSON, OF TORONTO, CANADA.

ANTISLIP-OVERSHOE FOR HORSES.

1,077,765. Specification of Letters Patent. Patented Nov. 4, 1913.

Application filed February 9, 1912. Serial No. 676,558.

*To all whom it may concern:*

Be it known that I, PHILIP STRUCK, of the city of Toronto, in the Province of Ontario, Canada, have invented certain new and useful Improvements in Antislip-Overshoes for Horses, of which the following is a specification.

This invention relates to detachable devices to be applied to a horse's foot over its ordinary shoes for the purpose of preventing slipping when roads are icy or greasy, and my object is to construct a device of this kind which will not only be effective as an anti-slip attachment, but will provide also an effective cushion for the horse's feet against jar.

With this object in view my invention consists, essentially, of the constructions hereinafter described and illustrated in the accompanying drawings, in which—

Figure 1 is a side elevation showing my device applied to a horse's foot, and Fig. 2 a bottom plan view of the same.

In the drawings, like letters of reference indicate corresponding parts in the different figures.

The shoe is formed by bending into horseshoe shape a wire A, the rear ends of which are tied together by the cross wire B. This wire is inclosed in a coil spring C formed of a high quality of steel wire. A cross wire D connects the sides of the wire A toward the front of the overshoe, and about this is placed the transverse coil spring E giving an additional grip and serving also to protect the horse's hoof from contact with lumps of ice or the like.

The parts just described form the tread of the shoe and this tread is connected with the hoof by means of the wire frame F adapted to lie on each side of the hoof of the horse and pass round over the heel as shown. Loops are formed in this frame connected by the links G with the wire A. At the front end of the frame loops H are formed through which a strap I passes. It is evident that by tightly buckling up this strap the frame F will be clamped on the horse's hoof securely retaining the tread portion of the device in place.

The rear of the wire frame F is preferably provided with the pad J to prevent it injuring the horse's foot.

The coils of the springs afford a very effective grip on the road surface and from their springy nature naturally ease the jar of the horse's foot on the hard road surfaces.

What I claim as my invention is:—

1. An anti-slip horseshoe comprising a wire coil bent round in horseshoe shape; means tying together the rear ends of the shoe; means tying together the opposite sides of the shoe intermediate the toe and heel; and means for detachably securing the same beneath a horse's hoof.

2. An anti-slip horseshoe comprising a wire coil bent round in horseshoe shape; a core extending through the same from end to end; and means for detachably securing the same beneath a horse's hoof.

3. An anti-slip horseshoe comprising a wire coil bent round in horseshoe shape; a core extending through the same from end to end; means tying together the rear ends of the core; and means for detachably securing the same beneath a horse's hoof.

4. An anti-slip horseshoe comprising a wire coil bent round in horseshoe shape; a core extending through the same from end to end; means tying together the rear ends of the core; means tying together the opposite sides of the core intermediate the toe and the heel; and means for detachably securing the same beneath a horse's hoof.

5. An anti-slip horseshoe comprising a wire core bent round to horseshoe form; a wire coil surrounding the same; a wire tying together the rear ends of the core; and means for detachably securing the same beneath a horse's hoof.

6. An anti-slip horseshoe comprising a wire core bent round to horseshoe form; a wire coil surrounding the same; a wire tying together the rear ends of the core; a wire tying together the opposite sides of the core intermediate the toe and the heel: and means for detachably securing the same beneath a horse's hoof.

Toronto this 1st day of Feb., 1912.

PHILIP STRUCK.

Signed in the presence of—
J. EDW. MAYBEE,
E. P. HALL.

---

Copies of this patent may be obtained for five cents each, by addressing the "Commissioner of Patents, Washington, D. C."